(12) United States Patent
Lee et al.

(10) Patent No.: US 12,227,320 B2
(45) Date of Patent: Feb. 18, 2025

(54) STORAGE STATION FOR UNMANNED VTOL AIRCRAFTS

(71) Applicant: KOREA AEROSPACE RESEARCH INSTITUTE, Daejeon (KR)

(72) Inventors: Sang Cherl Lee, Daejeon (KR); Myeong Shin Lee, Daejeon (KR); Jung Hyun Lee, Daejeon (KR); Hee Seob Kim, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 11 days.

(21) Appl. No.: 18/328,394

(22) Filed: Jun. 2, 2023

(65) Prior Publication Data

US 2024/0140630 A1   May 2, 2024

(30) Foreign Application Priority Data

Oct. 28, 2022   (KR) ........................ 10-2022-0141604

(51) Int. Cl.
*B64U 80/10*   (2023.01)
*B64U 80/25*   (2023.01)
(Continued)

(52) U.S. Cl.
CPC ............. *B64U 80/10* (2023.01); *B64U 80/25* (2023.01); *B64U 80/40* (2023.01); *B64U 80/70* (2023.01)

(58) Field of Classification Search
CPC ........ B64U 80/10; B64U 80/20; B64U 80/25; B64U 80/40; B64U 80/70; B64U 50/30; B64U 70/90; B64D 39/06
See application file for complete search history.

(56) References Cited

U.S. PATENT DOCUMENTS 9,505,493 B2 * 11/2016 Borko .................... B64U 10/10
2016/0039300 A1 * 2/2016 Wang .................... B64D 35/02
244/58
(Continued)

FOREIGN PATENT DOCUMENTS

CN          111775815 A  * 10/2020
CN          216942847 U  *  7/2022  ............ B60P 1/4407
(Continued)

*Primary Examiner* — Joshua J Michener
*Assistant Examiner* — Cindi M Curry
(74) *Attorney, Agent, or Firm* — Rabin & Berdo, P.C.

(57) ABSTRACT

A storage station for unmanned vertical take-off and landing (VTOL) aircrafts includes a storage case (110) for accommodating an unmanned VTOL aircraft therein, a first coupling member (120) having one end pivotably coupled to an inner upper surface of the storage case and the other end protruding out of the storage case by a pivoting operation, and a second coupling member (130) provided at the other end of the first coupling member, in which one end of a main body of the unmanned VTOL aircraft is coupled to the second coupling member, and the second coupling member is rotatable about a rotation axis in a longitudinal direction of the first coupling member, whereby it is possible to provide an advantageous effect of simultaneously storing and charging multiple drones on sides, and it is particularly possible to provide an advantageous effect of charging and storing a large number of drones used in swarm flight technology, which has recently become increasingly useful.

8 Claims, 5 Drawing Sheets

(51) Int. Cl.
 *B64U 80/40* (2023.01)
 *B64U 80/70* (2023.01)

(56) References Cited

U.S. PATENT DOCUMENTS

| | | | |
|---|---|---|---|
| 2018/0178665 A1* | 6/2018 | Chen | B64U 50/37 |
| 2019/0193952 A1* | 6/2019 | Zevenbergen | B64U 80/25 |
| 2020/0290752 A1* | 9/2020 | Kolosiuk | B64U 70/30 |
| 2021/0047055 A1* | 2/2021 | Lee | B64F 1/36 |
| 2021/0311502 A1* | 10/2021 | Ghio | B64U 10/16 |

FOREIGN PATENT DOCUMENTS

| | | | |
|---|---|---|---|
| JP | 2021160694 A | 10/2021 |
| KR | 20160009446 A | 1/2016 |
| KR | 20160042169 A | 4/2016 |
| KR | 10-2017-0138663 A | 12/2017 |

\* cited by examiner (a)

(b)

(c)

(d)

STORAGE STATION FOR UNMANNED VTOL AIRCRAFTS

CROSS-REFERENCE TO RELATED APPLICATION

This application claims priority to Korean Patent Application No. 10-2022-0141604, filed in the Korean Intellectual Property Office on Oct. 28, 2022, the entire contents of which are hereby incorporated by reference.

TECHNICAL FIELD

The present disclosure relates to a station for efficient storage of multi-unmanned vertical take-off and landing (VTOL) aircrafts, and more particularly, to a technology for accommodating the unmanned VTOL aircrafts capable of vertical take-off and landing, while securing space efficiency by rotating the drones by 90 degrees before storage and sequentially arranging and storing the drones on sides in a transverse or longitudinal direction.

In recent years, use of a plurality of drones that are one example of the unmanned VTOL aircrafts for swarm flight rather than using only one single drone has gradually increased as its use expanded into the cultural and military fields, and so on, and accordingly, there is an increasing need for the technology for efficient storage and charging of these plurality of drones at once, and the present disclosure is directed to this need.

BACKGROUND ART

Use of the unmanned VTOL aircrafts in dangerous areas has recently increased, and it is expected that the field of commercialization of unmanned VTOL aircraft will further increase in the future. For example, the unmanned VTOL aircrafts are used for purposes such as crime prevention, local patrol, traffic information collection, etc. in sparsely populated areas, highly residential areas, and in places where it is difficult for human eyes to reach, and it is expected to be increasingly useful in infrastructure monitoring, forest fire observation, disaster monitoring, public order maintenance, river pollution monitoring, borderline surveillance, traffic monitoring, weather observation, etc. Accordingly, there will be a need for equipment capable of both storing and charging these unmanned VTOL aircrafts.

Recently, an increasing number of drones are used in various fields. In particular, there is a growing need for a station that can store and charge multiple drones at once in combination with automatic flight operation technology for public purposes such as infrastructure monitoring, forest fire observation, etc., and in particular, a structure that maximizes space utilization is required for the storage of multiple drones.

However, the currently developed technologies for drone storage stations is focused on accommodating and charging a single drone, resulting in problems that it is difficult to utilize the technologies for simultaneous storage of multiple drones.

SUMMARY

An object of the present disclosure is to provide a station for efficient charging and storage of multi-unmanned VTOL aircrafts, which maximizes space utilization with simultaneous storage and charging of multiple drones.

According to an embodiment, a storage station for unmanned VTOL aircrafts is provided, which may include a storage case 110 for accommodating an unmanned VTOL aircraft therein, a first coupling member 120 having one end pivotably coupled to an inner surface (inner upper surface, inner side surface or inner lower surface) of the storage case and the other end protruding out of the storage case by a pivoting operation, and a second coupling member 130 provided at the other end of the first coupling member, in which one end of a main body of the unmanned VTOL aircraft is coupled to the second coupling member, and the second coupling member is rotatable about a rotation axis in a longitudinal direction of the first coupling member.

The storage case may further include an opening and closing door 115 that opens one side surface, and a hinge member 118 that allows the one end of the first coupling member 120 to be attached to and pivot on the inner surface of the storage case.

The storage station for unmanned VTOL aircrafts may also include a post 150 for positioning the storage case at a predetermined distance apart from the ground, in which the storage case may be movable up and down along the post to allow maintenance of the storage case to be easily performed, and for upward and downward movement, a rack 155 may be provided inside the post and a pinion 110a may be provided on one side of the storage case so as to convert a rotational motion into a linear motion.

The first coupling member 120 and the second coupling member 130 may be provided in plural numbers in a transverse direction inside the storage case so as to store a plurality of unmanned VTOL aircrafts, and the storage case may be provided in plural numbers along an upward and downward direction of the post 150.

The unmanned VTOL aircraft stored in the storage case may be configured so as to be chargeable via the first and second coupling members.

According to the present disclosure, with the above configuration, it is possible to provide an advantageous effect of simultaneously storing and charging multiple drones on sides, in which case it is particularly possible to provide an advantageous effect charging and storing a large number of drones used in swarm flight technology, which has recently become increasingly useful with maximized space utilization.

BRIEF DESCRIPTION OF THE DRAWINGS

The above and other objects, features and advantages of the present disclosure will be described with reference to the accompanying drawings described below, where similar reference numerals indicate similar elements, but not limited thereto, in which.

DETAILED DESCRIPTION

The objectives, specific advantages and novel features of the present disclosure will become more apparent from the following detailed description and the preferred embodiments, which are associated with the accompanying drawings. In addition, terms described herein are terms defined in consideration of functions in the present invention, which may vary according to the intention or convention of a user or an operator. Therefore, definitions of these terms should be made based on the contents throughout the present specification.

Hereinafter, the present disclosure will be described in detail with reference to the accompanying drawings.

Figure 1:
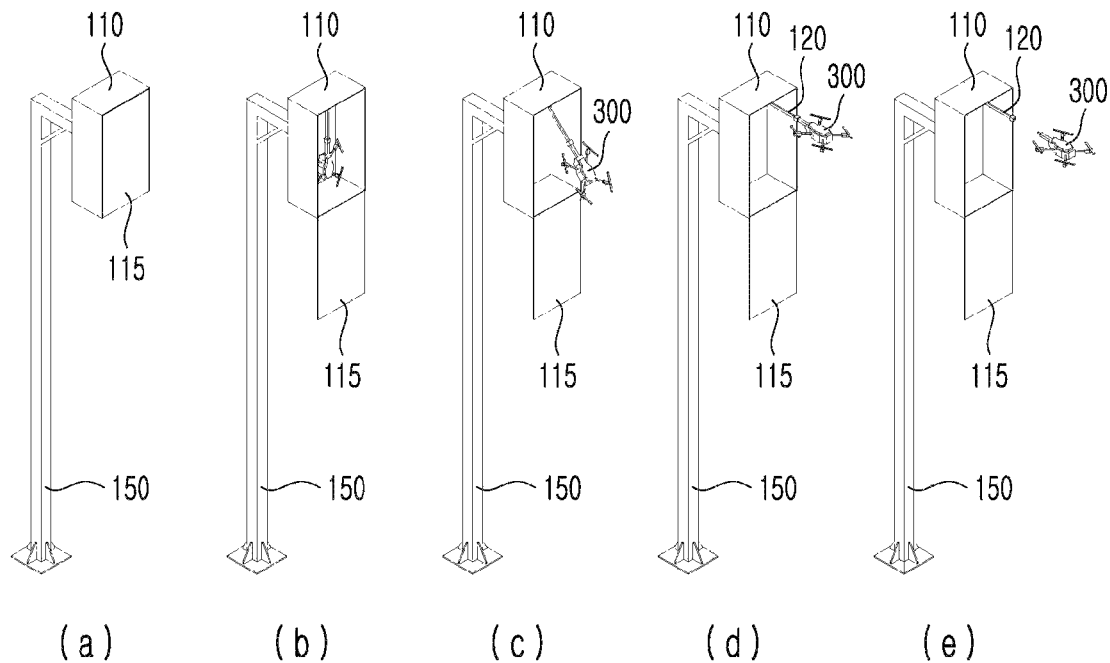
FIG. 1 shows diagrams showing a sequence of operations at a storage station for unmanned VTOL aircrafts according to an embodiment, and shows a process of a stored unmanned VTOL aircraft separating from the station.
Figure 2:
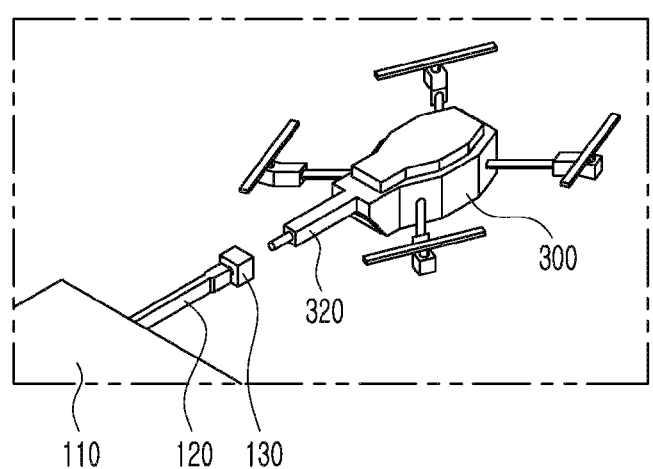
FIGS. 2 to 4 are partial detailed views provided to explain operations at the storage station for unmanned VTOL aircrafts according to an embodiment.
Figure 3:
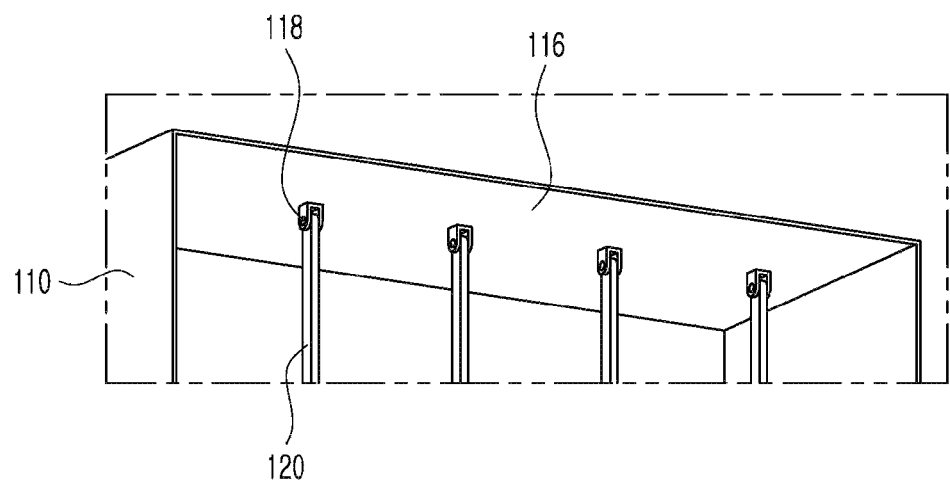
Figure 4:
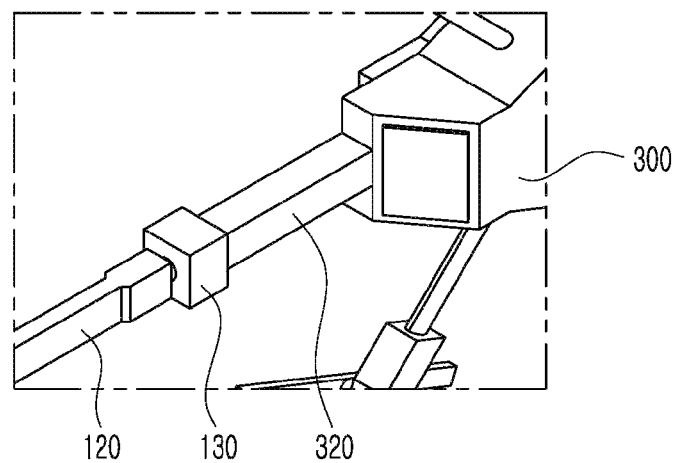
Figure 5:
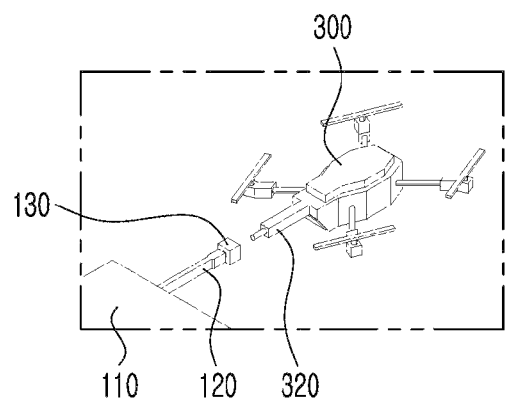
FIG. 5 shows a process of the unmanned VTOL aircraft engaging with the storage station for unmanned VTOL aircrafts according to an embodiment.
Figure 5:
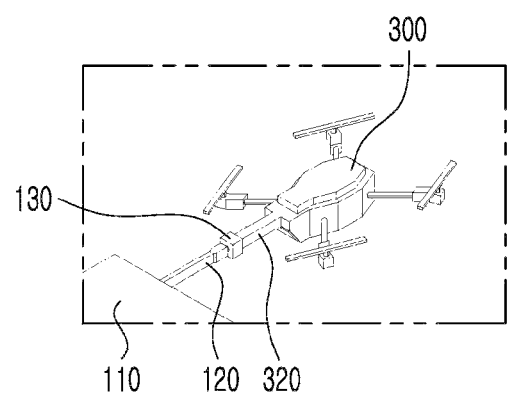
Figure 5:
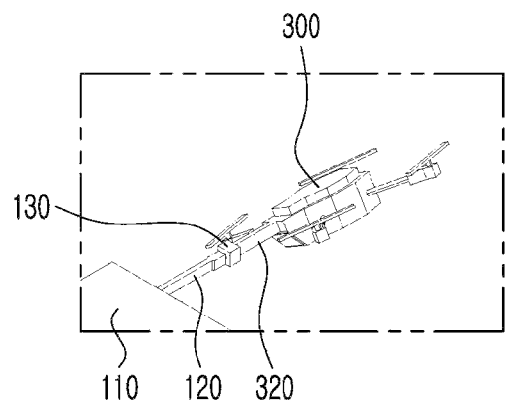
Figure 5:
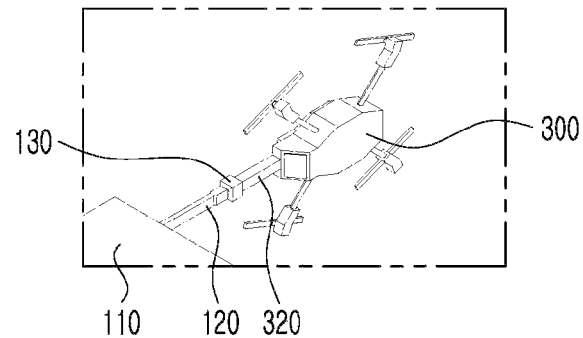
Figure 6:
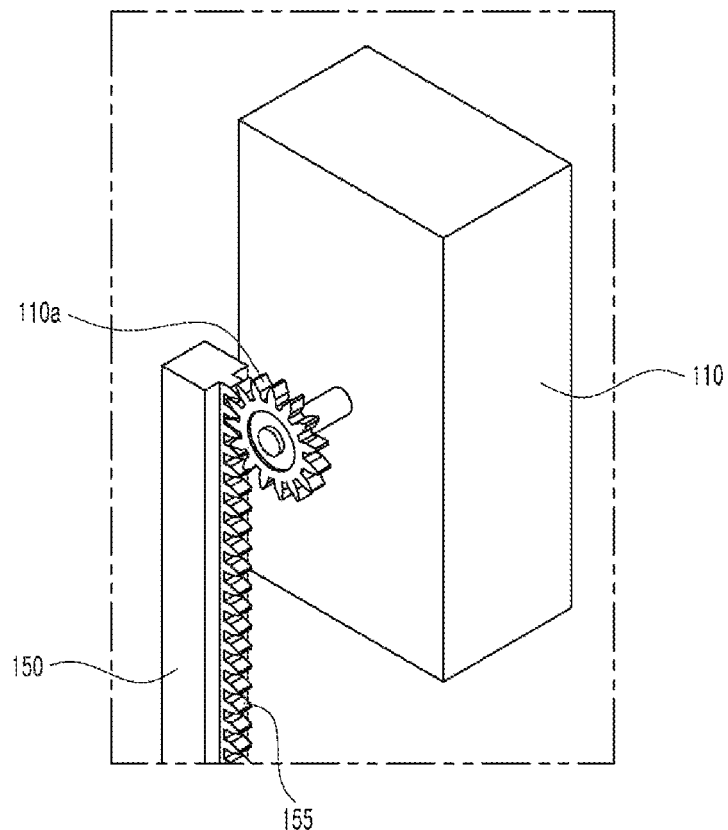
FIG. 6 shows the principle of moving a storage case up and down in the storage station for unmanned VTOL aircrafts according to an embodiment.
Figure 7:
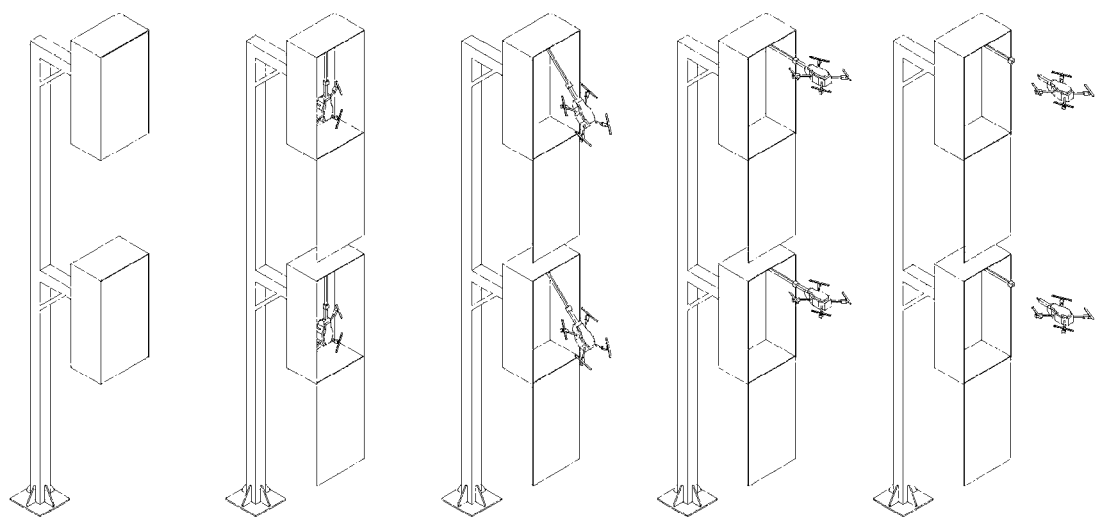
FIGS. 7 to 8 show several embodiments of the storage station for unmanned VTOL aircrafts.
Figure 8:
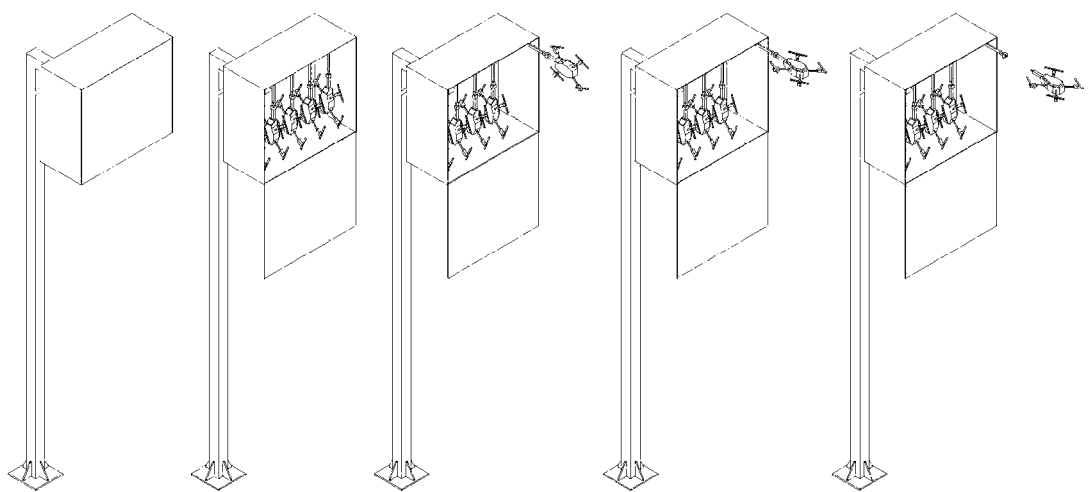

FIG. 1 shows diagrams showing a sequence of operations at a storage station for unmanned VTOL aircrafts according to an embodiment, and shows a process of a stored unmanned VTOL aircraft separating from the station, FIGS. 2 to 4 are partial detailed views provided to explain operations at the storage station for unmanned VTOL aircrafts according to an embodiment, FIG. 5 shows a process of the unmanned VTOL aircraft engaging with the storage station for unmanned VTOL aircrafts according to an embodiment, FIG. 6 shows the principle of moving a storage case up and down in the storage station for unmanned VTOL aircrafts according to an embodiment, and FIGS. 7 to 8 show several embodiments of the storage station for unmanned VTOL aircrafts.

First, referring to FIGS. 1 to 4, a structure of the storage station for unmanned VTOL aircraft (or drone) 300 according to an embodiment is shown, in which a storage case 110 having an opening and closing door 115 on the front side is located at a predetermined distance above the ground by a post 150, and the storage case is configured to receive the unmanned VTOL aircraft that completed a required flight process for storage and charging. The opening and closing door is opened by opening by one side of the storage case and can be opened in various ways, such as a sliding type as shown in the accompanying drawings.

FIG. 1 shows the process of the stored unmanned VTOL aircraft separating from the storage station in the reverse order of the process it was stored, in which the opening and closing door is opened, and then the unmanned VTOL aircraft stored inside is separated and starts to fly (the specific process of the separation operation is in the reverse of the storage process and will be described below).

The storage case 110 has, built therein, a first coupling member 120 and a second coupling member 130 to be engaged with the drones to be stored. The first coupling member 120 is configured such that its one end is pivotably coupled to an inner surface of the storage case. A hinge member 118 may be used to allow the one end of the first coupling member 120 to be pivotably coupled to the inner surface 116 of the storage case. The hinge member may be provided with a mechanical device such as an electric motor to allow the first coupling member 120 to protrude to the outside. The one end of the first coupling member 120 may be coupled to the inner upper surface, side surface, or lower surface of the storage case, and is illustrated as being coupled to the upper surface in the drawings, for example.

In addition, the other end of the first coupling member 120 protrudes out of the storage case by a pivoting operation of the first coupling member, and there is the second coupling member 130 provided at the other end of the first coupling member 120. That is, the second coupling member is provided at the other end of the first coupling member to be coupled with one end of a main body of the unmanned VTOL aircraft. In addition, the second coupling member 130 may be rotatable about a rotation axis in a longitudinal direction of the first coupling member. This rotation allows the unmanned VTOL aircraft to be stored in a direction where the unmanned VTOL aircraft has a relatively smaller cross-sectional area.

FIG. 5 shows a process of the unmanned VTOL aircraft being engaged with the storage station, and the operation of the first and second coupling members will now be described with reference to the drawing. As shown in FIG. 5, the process of storing the unmanned VTOL aircraft is performed in the order of 5A, 5B, 5C and 5D. The main body of the unmanned VTOL aircraft is rotated from the state of FIG. 5B to the state of FIG. 5D (which will be described below).

When the unmanned VTOL aircraft 300 approaches the storage case, the first coupling member 120 disposed inside the storage case is pivoted and deployed horizontally to the ground (FIG. 5A). Then, one end 320 of the unmanned VTOL aircraft is coupled to the second coupling member 130 located at the end of the first coupling member 120 (FIG. 5B). Various ways may be employed to couple the one end 320 of the unmanned VTOL aircraft to the second coupling member, and since these are commonly used techniques in the art, the specific description thereof will be omitted.

With the one end 320 of the unmanned VTOL aircraft being coupled to the second coupling member 130 in this way, the second coupling member is rotated about a rotation axis in a longitudinal direction of the first coupling member. During this process, the main body of the unmanned VTOL aircraft is rotated by about 90 degrees, and FIG. 5D shows a final state in which the rotation is completed, while FIG. 5C shows an intermediate stage in which the rotation is being performed by about 45 degrees. As shown in FIG. 5D, the main body of the unmanned VTOL aircraft is rotated by 90 degrees, so that one blade (e.g., the left blade) of the unmanned VTOL aircraft is positioned at the top and the other blade (e.g., the right blade) is positioned at the bottom.

In addition, in the state of FIG. 5D, the hinge 118 coupled to the inside of the storage case is pivoted, so that the unmanned VTOL aircraft is accommodated in the storage case. Through this process, the unmanned VTOL aircraft can be accommodated while occupying only a relatively smaller space within the storage case (see FIG. 8). This is very advantageous in terms of space efficiency in a situation where multiple unmanned VTOL aircraft are stored.

In addition, in the present disclosure, the storage case is movable up and down along the post for maintenance of the storage case and the like, and the upward and downward movement is enabled by providing a rack 155 inside the post and a pinion 110a on one side of the storage case (see FIG. 6).

The storage station of the present disclosure may store a single unmanned VTOL aircraft, and can be applied with various modifications as shown in FIGS. 7 to 8 so as to store a plurality of unmanned VTOL aircrafts. FIG. 7 shows an embodiment in which a plurality of storage cases are provided along a transverse direction of the post 150, and FIG. 8 shows an embodiment in which the required number of first and second coupling members 120 and 130 are arranged in a longitudinal direction inside the storage case so as to store the plurality of unmanned VTOL aircrafts.

In addition, the unmanned VTOL aircraft stored inside the storage case may be configured to be chargeable via the first and second coupling members, and the method and structure of charging the unmanned VTOL aircraft are technologies commonly used in the art, so detailed descriptions thereof will be omitted.

Although the present disclosure has been described in connection with some examples herein, the present disclosure should not be limited to those examples only, and various other changes and modifications made by those skilled in the art from the basic concept of the disclosure are also within the scope of the claims appended herein.

What is claimed is:

1. A storage station for unmanned vertical take-off and landing (VTOL) aircrafts, comprising:
    a storage case (110) for accommodating an unmanned VTOL aircraft therein;
    a first coupling member (120) having one end pivotably coupled to the inside of the storage case and the other end protruding out of the storage case by a pivoting operation; and
    a second coupling member (130) provided at the other end of the first coupling member, wherein one end of a main body of the unmanned VTOL aircraft is coupled to the second coupling member, and the second coupling member is rotatable about a rotation axis aligned with a longitudinal direction of the first coupling member which extends from the one end to the other end,
    wherein the first coupling member and the second coupling member are provided in plural numbers inside the storage case so as to store a plurality of unmanned VTOL aircrafts.

2. The storage station for unmanned VTOL aircrafts according to claim 1, wherein the storage case further comprises an opening and closing door (115) that opens one side surface.

3. The storage station for unmanned VTOL aircrafts according to claim 1, further comprising a hinge member (118) that allows the one end of the first coupling member (120) to pivot on an inner surface of the storage case.

4. The storage station for unmanned VTOL aircrafts according to claim 1, further comprising a post (150) for positioning the storage case at a predetermined distance apart from the ground.

5. The storage station for unmanned VTOL aircrafts according to claim 4, wherein the storage case is movable up and down along the post to allow maintenance of the storage case to be easily performed.

6. The storage station for unmanned VTOL aircrafts according to claim 5, wherein a rack (155) is provided inside the post and a pinion (110a) is provided on one side of the storage case so that the storage case is moved up and down.

7. The storage station for unmanned VTOL aircrafts according to claim 4, wherein the storage case is provided in plural numbers along an upward and downward direction of the post (150).

8. The storage station for unmanned VTOL aircrafts according to claim 1, wherein the unmanned VTOL aircrafts stored in the storage case are chargeable via the first and second coupling members.

* * * * *